P. P. MAST & C. O. GARDINER.
Improvement in Seeding-Machines.
No. 131,014. Patented Sep. 3, 1872.
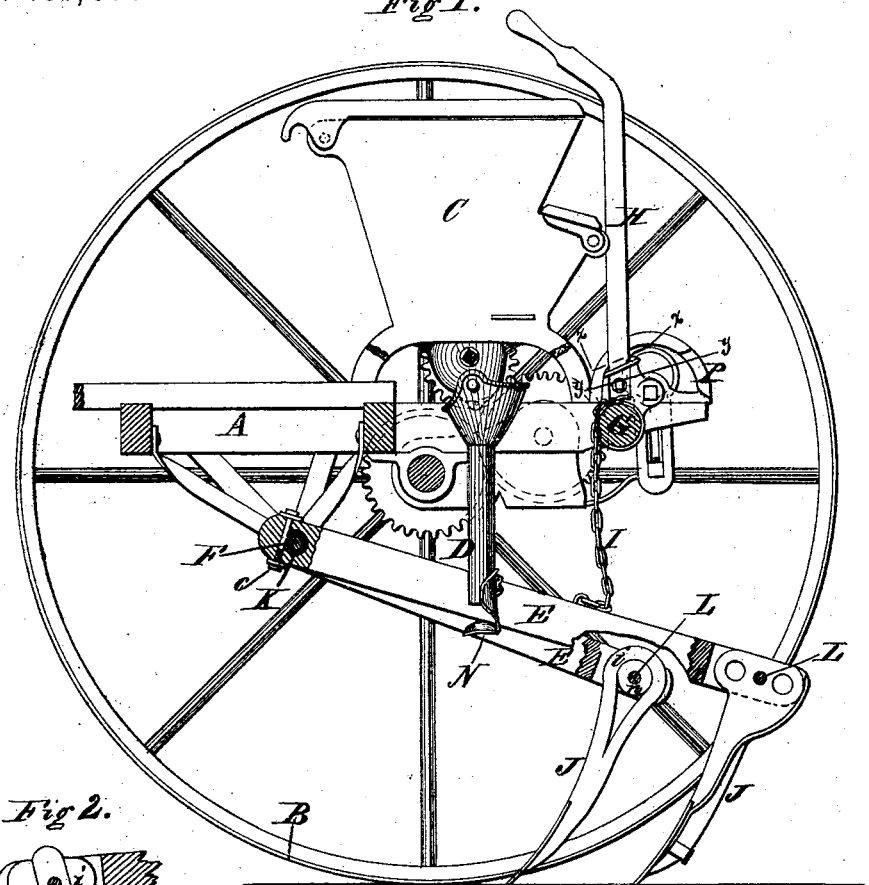

UNITED STATES PATENT OFFICE.

PHINEAS P. MAST AND CHARLES O. GARDINER, OF SPRINGFIELD, OHIO, ASSIGNORS TO P. P. MAST & CO., OF SAME PLACE.

IMPROVEMENT IN SEEDING-MACHINES.

Specification forming part of Letters Patent No. 131,014, dated September 3, 1872.

SPECIFICATION.

*To all whom it may concern:*

Be it known that we, PHINEAS P. MAST and CHARLES O. GARDINER, of Springfield, in the county of Clarke and State of Ohio, have invented certain Improvements in Seeding-Machines, of which the following is a specification, reference being had to the accompanying drawing.

Our invention consists in a novel manner of securing tubes or thimbles in the front ends of the drag-bars to receive the supporting shaft or pivot; in a novel manner of constructing the hoe or shovel standards and jointing them to the drag-bars; in a device for scattering or distributing the grain; and in a novel manner of arranging the locking hand-lever by which the drag-bars are raised.

Figure 1 is a longitudinal section through a broad-cast seeding-machine having our improvements embodied therein. Figs. 2, 3, 4, and 5 are views, showing the manner of attaching the hoe-standards to the drag-bars. Fig. 6 is a horizontal section through the front end of one of the drag-bars with the tube or thimble therein. Figs. 7 and 8 are sections taken, respectively, on the lines $x\ x$ and $y\ y$ of Fig. 1, showing the arrangement of the hand-lever. Fig. 9 is a vertical section through one of the seed-tubes with our scattering device applied; and Fig. 10 is a view of one of the tubes or thimbles for the drag-bars.

The drawing represents a machine of the same general construction as those now in general use.

A is the frame; B B, the wheels; C, the seed-hopper, provided with suitable feeding devices; D D, the seed-tubes; E, the drag-bars, having their forward ends mounted on the transverse rod or shaft F secured under the front of the frame; G, the rear shaft, provided with the hand-lever H and chains I for raising the drag-bars; and J J, the hoe or shovel standards, having their upper ends jointed to the drag-bars.

The first part of our invention consists in a novel manner of securing in the front ends of the drag-bars tubes or thimbles to fit upon the supporting-rod, and hold the bars in their proper positions. In doing this we first provide a metal tube, K, as shown in Fig. 10, having a collar or flange, $a$, around it, near one end, and a notch or groove, $b$, in its side, at the middle. We then insert this tube tightly into a hole through the front end of the drag-bar, driving it in so that the flange $a$ bears against the side of the bar, and taking care that the notch $b$ is brought on the front side, as shown in Fig. 6. We then bore a vertical hole down through the end of the drag-bar in line with the notch $b$, and insert a bolt, $c$, therein, as shown in Figs. 1 and 6, and screw it up tightly. The bolt thus applied rests in the notch $b$, and prevents the tube from either turning or moving endwise in its seat, and also compresses the wood against the outside of the tube and prevents it from splitting or giving way when strain is brought upon it. The tubes are made of such length that, when slipped onto the rod F, they bear end to end so as to keep the drag-bars at their proper distance apart, and also give a long bearing on the rod. When the tubes or thimbles thus secured to the drag-bars are slipped on the rod F they permit the bars to rise and fall with perfect freedom, but prevent them from either swinging laterally or from twisting so as to let the teeth or standards fall out of their proper upright position.

We are aware that metal thimbles or bushings have been heretofore applied to drag-bars for these purposes; but in such cases the front ends of the bars have been split and then squeezed up by a bolt, which failed to hold the tubes securely.

The second part of our invention consists in a novel manner of constructing the hoe or shovel standards, and of jointing them to the drag-bar so that they can be set at any inclination, and can yield when they meet obstructions. This we accomplish by providing the standard J with a large flat head, $i$, thinner at its center than at its edges, and then pivoting this head in a slot, $l$, in the drag-bar by means of a bolt, L, which also serves to compress the bar against the sides of the head so as to hold it, and thereby the standard, in position. By making the central portion of the head thinner than the edges the entire pressure of the wood is received on the edges, and thus the head held in a much firmer manner than if the pressure was distributed over the entire faces.

In Fig. 1 two forms of the head or joint are shown. In the one on the right the head is formed solidly upon and in one piece with the body of the standard. In the one on the left the head of the standard is also formed rigidly upon it, but has a large opening made through its center, and a thin washer, $n$, inserted therein to receive the bolt and hold the head in position. This form is considered preferable to that above described for the reason that, when made of wrought-iron, its head can be formed by bending a narrow bar around in form, and then welding its ends to the body, or by bending the upper ends of the standard itself, which is cheaper than to form a solid head. A still better arrangement is, however, shown in Figs. 2 and 3, in which the head $i$ is made in a separate piece, and provided with a gain or recess in its side to receive the end of the standard, which is inserted therein and held by passing the pivot-bolt through both parts. In this instance the head is represented as convex on one side and concave on the other, so that the pressure is received on the edges of one side only; but it is obvious that both sides may be made concave, if desired.

Figs. 4 and 5 show a form of head the same as that shown on the left hand in Fig. 1, except that it is concave on one side only, like that in Figs. 2 and 3. By thus providing the standards with the large heads and arranging the heads so as to bear at their outer edges, a long distance from the pivot or fulcrum, we are enabled to clamp them firmly in position, so as to hold the hoes to their work, while, at the same time, if the hoe meets any rigid obstruction, the strain will be sufficient to swing the standard back, and thus prevent breakage. By constructing and arranging the head as described, and using one bolt for the pivot and for compressing the bar, we produce a very simple and cheap joint. It is obvious that the heads may be made of various forms besides those shown, the essential point being to have the bearing-points as far as possible from the pivot.

The next part of our invention relates to the distributing or scattering devices, and consists simply in suspending under the mouth of the hinged seed-tube a hemispherical or conical block, N, as shown in Figs. 1 and 9, so that the descending grain will impinge thereon and be thrown off evenly in all directions. We are aware that a pyramidal block has been used for this purpose; but as it threw the grain off at right angles to its faces, there was an open space opposite each corner or angle, into which no grain was thrown, so that the grain was scattered very unevenly. By using our device, having no corners or angles, this difficulty is remedied and grain distributed with perfect uniformity in all directions. The seed-tube should, as shown, be suspended freely from the feeding devices, so that it can hang steadily, notwithstanding the jarring and jolting of the machine, which would, if the tube were rigidly attached, materially interfere with the even distribution of the grain. The spreader or distributer may be attached to the tube in any suitable manner, it being shown in the drawing with an upright slotted arm, S, which is slipped onto studs on the tube and secured by pins.

The last part of our invention consists in a novel manner of arranging the hand-lever H, by which the shaft G is turned to raise the drag-bars. Ordinarily this lever has been made of steel and rigidly secured to the end of the shaft, so as to spring sidewise and lock into the notched plate or rack P. We attach to the end of the shaft a metal head or plate, R, provided with a V-shaped socket, $t$, the narrow edge of which is toward the rear. Into this socket we insert the end of the hand-lever, so that its lower or rear edge rests in the narrow side of the socket, as shown in Figs. 7 and 8, so that its upper or forward edge can tip sidewise in the wide portion of the socket. To prevent the lever from being withdrawn a bolt, $w$, is passed through a hole in its end, as shown in Figs. 1, 7, and 8. The lever is turned or bent outward, and has its end bent upward, as shown, so that, when pulled backward, it will tip outward toward the right, so as to engage in the rack, as shown in Fig. 7. It is disengaged from the rack by pulling it downward out of the notch and then pushing or tipping it to the left, the lateral or tipping movement being regulated by the socket at the inner end. In this way we cause the lever to turn outward and lock automatically as it is drawn back without depending on or using springs of any kind, the arrangement being much cheaper and stronger than those heretofore in use.

It is obvious that there are other ways in which the lever may be attached to the shaft so as to have the lateral tipping movement and answer the same purpose. It is also obvious that, instead of making the heads $i$ of increased thickness at their edges, or of bending them so as to bear at their ends or edges only, the same object may be accomplished by using a flat head of uniform thickness and cutting away the drag-bar, so as to bear on the edges only of the head.

We are aware that tubular bearings have been inserted in drag-bars in various ways, and also that the teeth have been held in the bars by a variety of clamping devices; and therefore we do not claim these ideas broadly; but

Having thus described our invention, what we claim is—

1. The drag-bar E, having the tubular bearing K, held in place by means of a bolt, $c$, engaging in the groove $b$, substantially as set forth.

2. The tubular bearing K, provided with the flange or shoulder $a$, in combination with the drag-bar E, substantially as described.

3. The hoe or tooth J, having an enlarged head, constructed as described, and clamped within the slotted end of the drag-bar by means of a single bolt passing transversely through them, as set forth.

4. The plate R, provided with the V-shaped recess $t$, with the lever H pivoted loosely therein, in combination with the locking segment P, all constructed and arranged to operate as set forth.

PHINEAS P. MAST.
CHARLES O. GARDINER.

Witnesses:
 GEO. ARTHUR,
 J. W. JARRETT.